United States Patent [19]

Randall

[11] Patent Number: 4,540,883
[45] Date of Patent: Sep. 10, 1985

[54] BACKGROUND CORRECTION METHOD AND APPARATUS FOR PULSED NEUTRON LOGGING OF EARTH BOREHOLES

[75] Inventor: Russel R. Randall, Katy, Tex.

[73] Assignee: Dresser Industries, Inc., Dallas, Tex.

[21] Appl. No.: 417,270

[22] Filed: Sep. 13, 1982

[51] Int. Cl.³ .............................................. G01V 5/10
[52] U.S. Cl. .................................... 250/262; 250/270
[58] Field of Search ........................ 250/269, 270, 262

[56] References Cited

U.S. PATENT DOCUMENTS

| | | | |
|---|---|---|---|
| 3,706,884 | 12/1972 | Youmans | 250/83.3 |
| 3,733,486 | 5/1973 | Arnold et al. | 250/71.5 R |
| 3,842,264 | 10/1974 | Arnold et al. | 250/264 |
| 4,041,309 | 8/1977 | Hopkinson | 250/262 |
| 4,046,764 | 9/1977 | Marquis | 250/262 |
| 4,157,469 | 6/1979 | Randall | 250/262 |
| 4,232,220 | 11/1980 | Hertzog | 250/270 |
| 4,292,518 | 9/1981 | Johnstone | 250/262 |
| 4,327,290 | 4/1982 | Plasek | 250/262 |
| 4,385,235 | 5/1983 | Hastings | 250/270 |

OTHER PUBLICATIONS

A New Thermal Neutron Decay Logging System-TDT-M by J. E. Hall, C. W. Johnstone, J. L. Baldwin and L. A. Jacobson, an SPE Publication #9472; this paper was presented at the 55th Annual Fall Technical Conference and Exhibition of the Society of Petroleum Engineers of AIME, held in Dallas, Texas, Sep. 21-24, 1980.

Primary Examiner—Alfred E. Smith
Assistant Examiner—Carolyn E. Fields
Attorney, Agent, or Firm—Patrick H. McCollum; Richard M. Byron

[57] ABSTRACT

A neutron source in a well logging instrument is periodically pulsed and secondary radiations emanating from the irradiated formations are measured by a detector system. Circuitry is provided for establishing the points in time at which radiation is detected within a signal measurement time interval and generating a timing function relating to the time distribution of the detected pulses. Additionally, the total count rate for the detected pulses within the signal measurement interval and count rate of detected pulses within a background measurement time interval are processed to obtain a measurement of relative background intensity. The relative background intensity and a timing function for background only within the signal measurement interval are used to correct the timing function for total detected pulses to provide a timing function for only the exponential signal. Each value of corrected timing function will define a single value of the macroscopic absorption cross-section of the irradiated earth formations.

20 Claims, 5 Drawing Figures

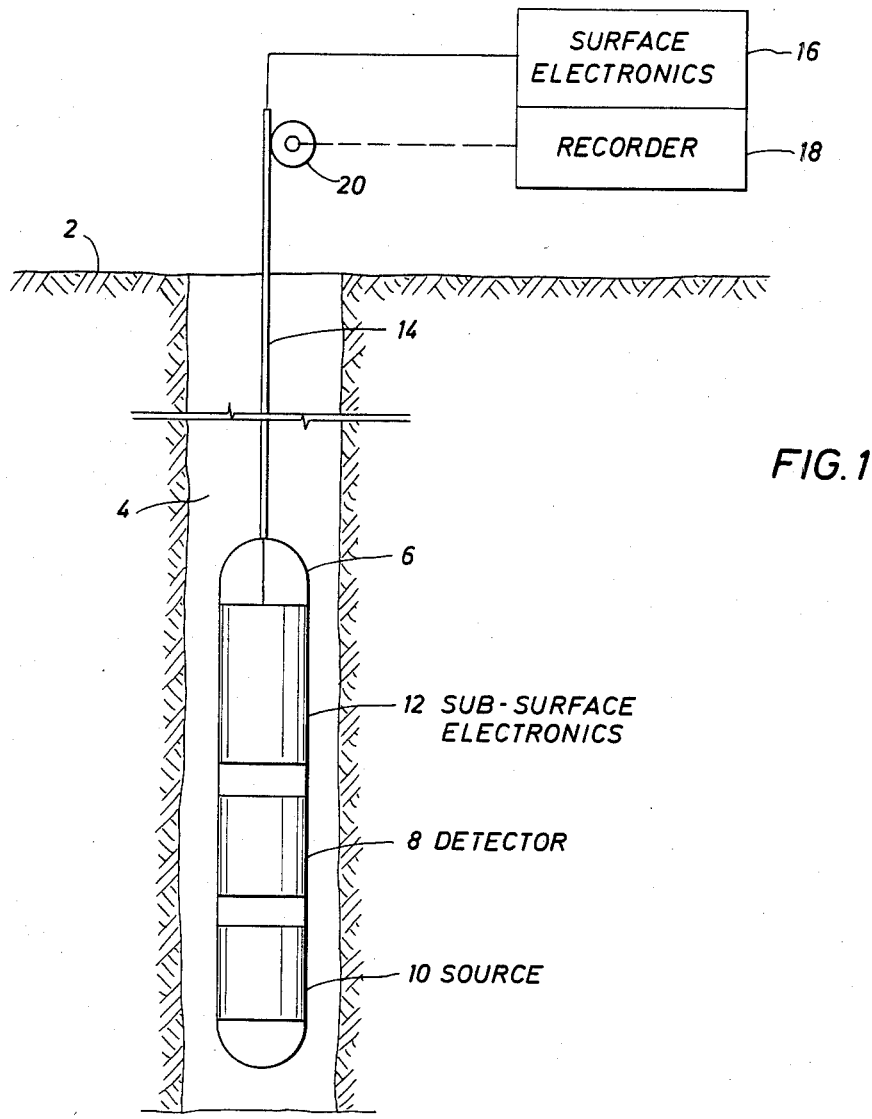
FIG. 1
FIG. 4
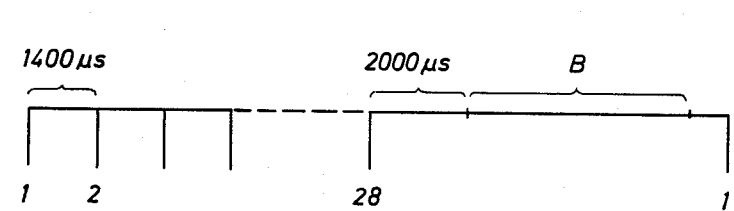

BACKGROUND CORRECTION METHOD AND APPARATUS FOR PULSED NEUTRON LOGGING OF EARTH BOREHOLES

BACKGROUND OF THE INVENTION

This invention relates to the art of geophysical prospecting in general, to the art of radioactivity well logging in particular, and more particularly, to improved methods and apparatus for background subtracting for pulsed neutron logging of earth formations traversed by a borehole.

It is known in the prior art to irradiate earth formations with neutrons from a neutron source, for example, a D-T accelerator. These neutrons participate in elastic collisions with the atoms contained in the various layers of the earth formations. Secondary radiations resulting from the bombardment of the formations by the primary radiation are detected following the cessation of the irradiation. The measurement of the decline of the thermal neutron population provides a means for determining a property of the material surrounding the borehole, the macroscopic capture cross-section [Sigma ($\Sigma$)] of the formation.

In U.S. Pat. No. 3,379,882, issued to A. H. Youmans and assigned to the assignee of the present invention, there is described and illustrated a system for radioactivity well logging wherein the earth formations are irradiated with neutrons from a periodically varying source operating at a repetition rate of the order of magnitude of hundreds or thousands of cycles per second, being thus alternately on and off for periods of hundreds of microseconds. A detecting system is synchronized with the source to operate while the source is in an off state. The radiation detected may be either slow neutrons or gamma rays which result from thermal neutron capture; in either instance the signal is related to the population of thermal neutron in the earth formations surrounding the borehole. By measuring the number of thermal neutrons or gamma rays produced by the thermal neutrons present at any particular time, the rate of decay of the thermal neutron population may be measured. The radioactivity well log which is normally conducted according to this described well logging system comprises a pair of counting rate curves plus a curve indicative of the rate of decline of the neutron population which is a function of ratio of the two counting rate curves. The rate of decline curve is calibrated to record the macroscopic thermal neutron capture cross-section of the earth formations.

In U.S. Pat. No. 3,706,884, also assigned to the assignee of the present invention, there is described a system for using three detection gates following each neutron burst and associated circuits for substantially eliminating radiation background count in pulsed neutron well logging. The third detection gate is used to obtain a relative measurement of background counting rate. The background measurement can then be used to correct the signal measurement counting rates of the two detection time intervals.

Yet another method and system of measuring the macroscopic thermal neutron capture cross-section of the earth formations is described in U.S. Pat. No. 4,046,764, issued to G. L. Marquis and assigned to the assignee of the present invention. All of the detected pulses within a selected time interval following the neutron bursts are used to determine a single timing point. The timing point and the known absorption mode are used to compute the macroscopic cross-section. Since all detected data are used to determine the single value, the computed values of macroscopic cross-section are statistically more accurate than values obtained by prior systems. While the statistical reliability of this system is superior to the prior systems, a suitable method of compensating for timing background has been lacking.

Accordingly, the present invention overcomes these difficulties by providing method and apparatus for substantially eliminating the effect of background upon the timing measurement derived using a single signal detection interval.

SUMMARY OF THE INVENTION

A logging system is employed having a source for pulsatingly irradiating subsurface earth formations with high energy neutrons. Subsequent to the bursts of neutrons secondary radiations emanating from the irradiated formations are detected by a detecting system. The detected pulses occurring during a given signal measurement time interval are processed to derive a time distribution measurement for the pulses. Additionally, the total count rate for the detected pulses within the signal measurement time interval and the count rate of background pulses within a selected background measurement time interval within a quiescent period are measured. The count rates within the signal measurement interval and the background measurement interval are processed to derive a ratio of background signal to measurement signal. The measurement of the relative intensity of background count rate to signal count rate is combined with the time distribution of background counts within the signal measurement interval. The time distribution of the detected pulses within the signal measurement interval is corrected using the relative rate of background to signal count rate and the time distribution of background to derive a measurement of the time distribution of only the exponential signal within the signal measurement rate. Each value of the time relationship of the exponential signal will define a single value of the macroscopic neutron absorption cross-section of the irradiated earth formations.

BRIEF DESCRIPTION OF THE DRAWINGS

FIG. 1 is a side elevational view, partly in cross-section, of a radioactivity logging system in accordance with the present invention.

FIG. 4 is a simplified timing diagram illustrating one embodiment of source firing sequence along with background measurement timing.

DETAILED DESCRIPTION OF THE PREFERRED EMBODIMENT

Figure 2:
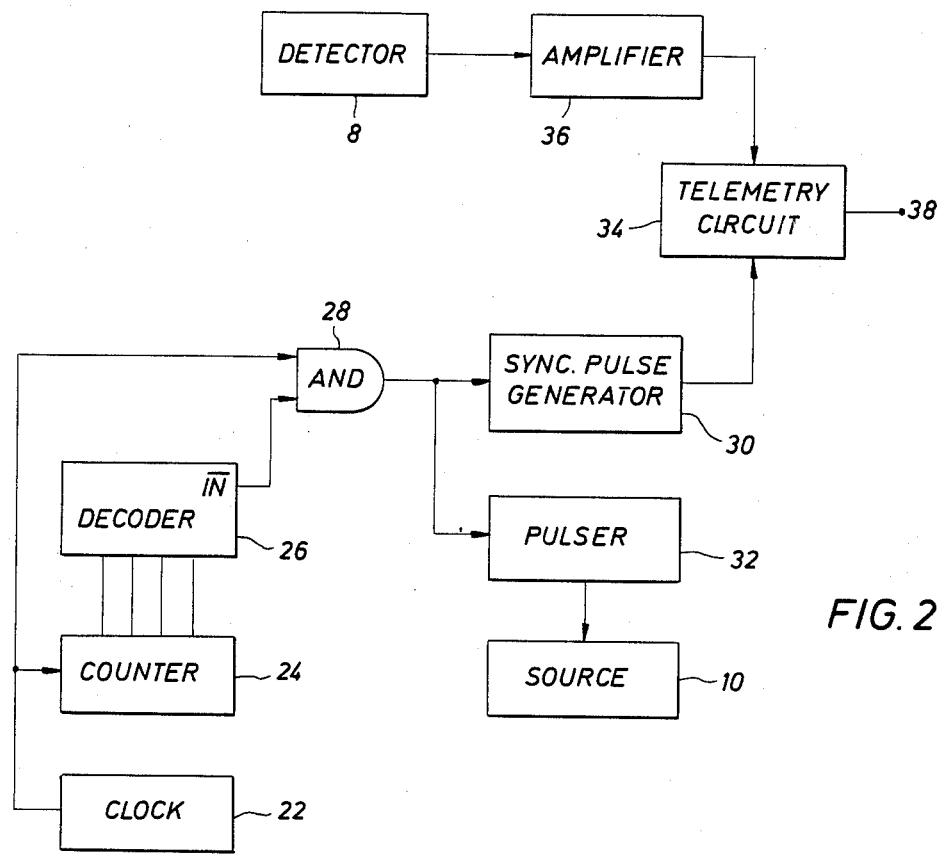
FIG. 2 illustrates in block diagram a portion of the subsurface electronic circuitry in accordance with the present invention.

Referring now to the drawings in detail, particularly to FIG. 1, there is illustrated schematically a radioactivity well surveying operation in which a portion of the earth's surface 2 is shown in vertical section. A borehole 4 penetrates the earth's surface, and may or may not be cased. Disposed within the borehole 4 is subsurface instrument 6 of the well logging system. Subsurface instrument 6 comprises a detecting system 8 and a neutron source 10 for irradiating the formations with neutrons. Also housed within instrument 6 is subsurface electronics 12 having the necessary power supply, signal processing and telemetry circuits for conducting a well logging operation. Cable or wireline 14 suspends instrument 6 in the borehole and contains the required conductors for electrically connecting the instrument with the surface apparatus of the well logging system. Cable 14 is wound on or unwound from a drum (not shown) in raising and lowering instrument to traverse the borehole.

In making a radioactivity log of a well, instrument 6 is caused to traverse the borehole. Thereby, neutrons from source 10 irradiate the formations surrounding borehole 4, and radiations influenced by the formations are detected by detecting system 8. The resulting signals are transmitted to the surface through electrical conductors within cable 14 and into surface electronics 16. After processing by the electronic circuitry hereinafter described and illustrated, the resulting information is recorded on recorder 18. The information on recorder 18 is recorded in a conventional manner as a function of instrument depth. Depth information is provided by measuring reel 20 over which cable 14 is drawn so that recorder 18 move in correlation with the movement of cable 14 and thus instrument 6 attached thereto. The elements of FIG. 1 are shown diagrammatically, and it is to be understood that the associated circuits and power supplies are provided in a conventional manner. It is also to be understood that the housing for instrument 6 is constructed to withstand the pressures and mechanical and thermal abuses encountered in logging a deep well and provide adequate space within it to house the necessary apparatus and to permit the transmission of radiation therethrough.

In the operation of the apparatus of FIG. 1, source 10 is preferably a neutron source which emits high energy neutrons, most preferably a pulsed neutron source, for example, a D-T accelerator. Source 10 is periodically activated, for example, approximately every 1400 microseconds, causing the formations surrounding source 10 to be irradiated with high energy neutrons. These neutrons participate in elastic and inelastic collisions with the atoms contained in the various layers of the formation. Secondary radiation resulting from bombardment are detected by detector system 8. In the preferred embodiment, the detector system 8 detects gamma radiation resulting from formation bombardment with neutrons. The measurement of the decline of the thermal neutron population is an exponential and provides a means for determining properties of the material surrounding the borehole, the macroscopic capture cross section of the formations, referred to as Sigma ($\Sigma$).

Referring now to FIG. 2, there is illustrated a portion of the sub-surface circuitry for generating the sync signals and signal pulses hereinafter illustrated and described. Clock circuit 22 is coupled into counter circuit 24. In the preferred embodiment counter circuit 24 is a five bit counter having the 0—3 output bit lines coupled into decoder circuit 26. The $\overline{\text{INHIBIT}}$ output of decoder circuit 26 is coupled to one input of two-input AND gate 28, the second input of which is connected to clock circuit 22. The output of AND gate 28 is coupled into high voltage pulser circuit 32. The output of high voltage pulser circuit 32 is coupled to source 10. In the preferred embodiment, source 10 is a conventional D-T accelerator producing high energy, 14 Mev neutrons at a rate as determined by clock 22. The discrete bursts of neutrons occur approximately 1400 microseconds apart and are generally of ten to fifty microseconds duration. Clock circuit 22 also drives sync pulse generation circuit 30 which has its output coupled into telemetry circuits 34. Detector 8 output is coupled to amplifier circuit 36, the output of which is coupled also into telemetry circuits 34. The output of telemetry circuits 34 is coupled to junction 38 which is connected to an electrical conductor within cable 14 serving to carry the signals to surface electronics 16 for further processing.

In operation of the circuitry and apparatus illustrated in FIG. 2, clock circuit 22 provides a clocking signal to counter circuit 24. As previously stated, counter 24 is preferably a five bit counter having the 0–3 bit output lines coupled into decoder circuit 26. Thus, decoder circuit 26 has an $\overline{\text{INHIBIT}}$ output present for twenty-eight clock pulses for every thirty-two clock pulse cycle. Therefore, AND gate 28 will have an output signal present for twenty-eight clock pulses and no output for four clock pulses. The AND gate 28 provides an initialization signal to high voltage pulser circuit 32 resulting in high voltage pulses being applied to neutron source 10 thereby generating discrete bursts of high energy neutrons. Additionally, the output signal from AND gate 28 is coupled to sync pulse generator 30. Detector 8 detects gamma radiation resulting from the capture of thermal neutrons occasioned in the formations surrounding the borehole by neutron 10. The detected pulses are amplified by amplifier 36 and combined with the sync pulses generated by sync pulse generator 30, for transmission to the earth's surface by way of telemetry circuits 34. The composite signal present on cable 14 consists of twenty-eight sync pulses, representing twenty-eight firings of neutron source 10, and quiescent period, the equivalent in time of four pulse cycles, during which period substantially only background is detected by detector 8. FIG. 4 illustrates the above-described timing.

Figure 3:
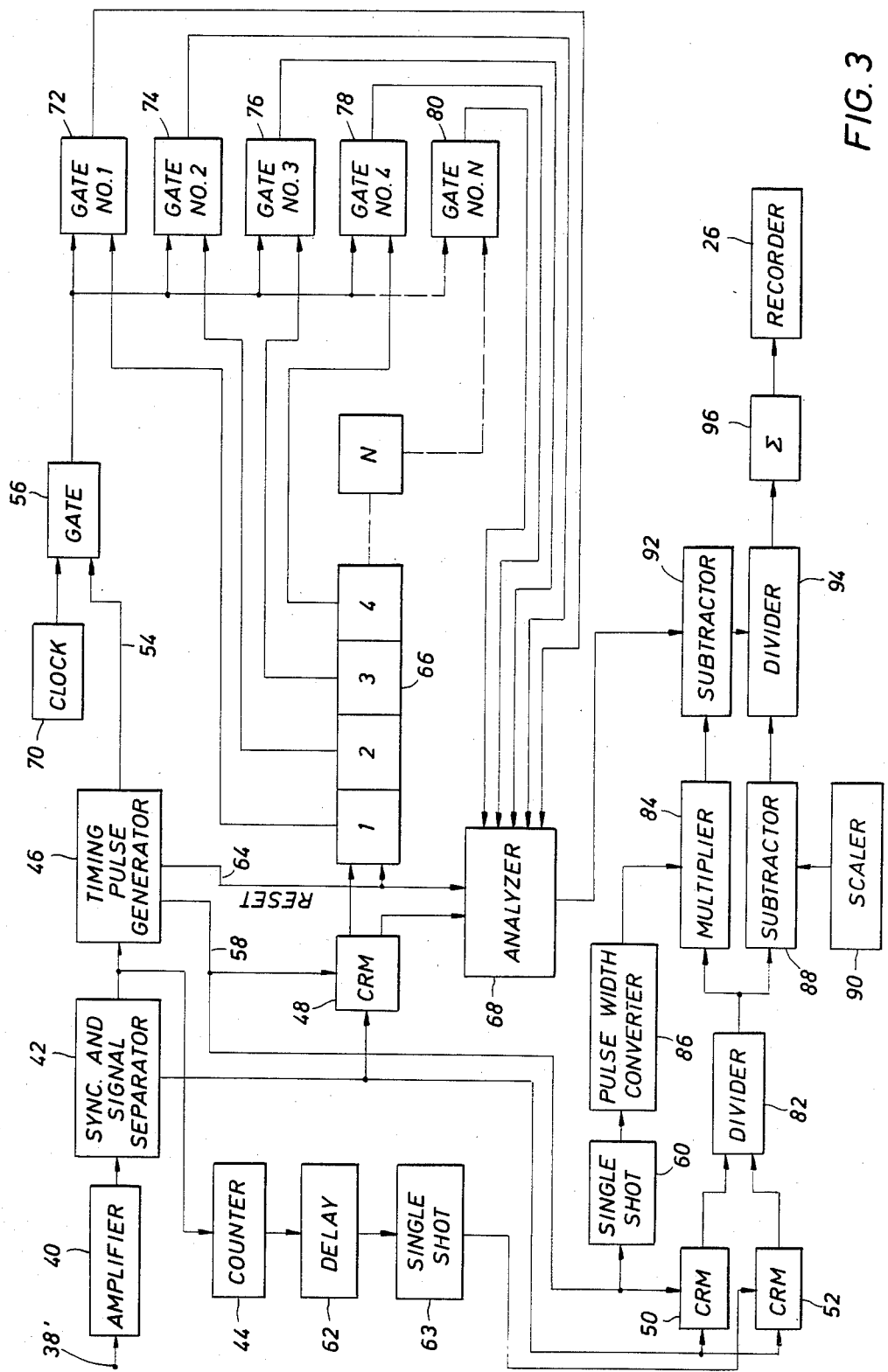
FIG. 3 illustrates in block diagram a portion of the surface electronic circuitry of the logging system.

Referring now to FIG. 3, the surface electronics shown generally by reference numeral 16 in FIG. 1 is shown in greater detail. Input terminal 38' corresponds to output terminal 38 in the subsurface circuitry. Terminal 38' is coupled into amplifier circuit 40, the output of which is coupled into sync and signal separator circuit 42, which separates the sync signal from the amplified signal pulses. The signal separation can be achieved by any conventional circuit devices, such as, for example, through pulse height discrimination. The sync output of separation circuit 42 is coupled to timing pulse generator circuit 46 and to counter 44. The signal output of sync and signal separator circuit 42 is coupled to the input of count rate meters 48, 50 and 52.

Timing pulse generator circuit 46 has one output coupled by electrical conductor 54 into gate circuit 56. Another output of timing pulse generator circuit 46 is coupled by electrical conductor 58 to the second inputs of count rate meters 48 and 50 and to the input of single shot multivibrator circuit 60. A reset output from timing pulse generator circuit 46 is coupled through electrical conductor 64 into pulse detector circuit 66 and analyzer 68. The output of counter circuit 44 is coupled to delay circuit 62 the output of which is connected to single shot multivibrator circuit 63, the output of which is coupled into a second input of count rate meter 52.

Also coupled into gate circuit 56 is the output from clock circuit 70. The output of gate circuit 56 is connected to a first input of each of a plurality of gate circuits 72, 74, 76, 78 and 80, also identified as gates No. 1, No. 2, No. 3, No. 4, and No. N, respectively. The output of count rate meter 48 is coupled into pulse detector circuit 66, which is for example a pulse register having a plurality of outputs which are connected respectively to the second inputs of gate circuits 72, 74, 76, 78 and 80. Pulse detector circuit 66 recognizes the time sequence of the output pulses coupled thereto from count rate meter 48 and sorts them accordingly. Thus, the first pulse in the detection cycle is passed to gate No. 1 and the second pulse received is passed in a similar manner to gate No. 2. By having a adequate number of locations within pulse detector circuit 66 and a correspondingly adequate number of gates, a timing gate is thus turned on by each pulse detected in count rate meter 48 at a time coinciding with the time position of that pulse in the pulse detection cycle. Following the end of the cycle, a reset pulse coupled on electrical conductor 64 from timing pulse generator circuit 46 returns pulse detector circuit 66 to its original condition. Output pulses from count rate meter 48 and from gate circuits 72, 74, 76, 78 and 80 are coupled into analyzer 68 along with a reset signal from timing pulse generator 46.

As previously mentioned, the signal pulse output from sync and signal separation circuit 42 is coupled into count rate meters 50 and 52. The outputs from count rate meters 50 and 52 are coupled into divider circuit 82. The output of divider circuit 82 is coupled into one input of multiplier circuit 84 and one input of subtractor circuit 88. The second input to multiplier circuit 84 is provided from pulse width converter circuit 86 the input to which is coupled from single shot multivibrator circuit 60. The second input to subtractor circuit 88 is provided from scaler 90. The output of multiplier circuit 84 is coupled into one input of subtractor circuit 92 the second input of which is coupled from analyzer 68. The output of subtractor circuit 92 is coupled to one input of divider circuit 94, the second input thereof is provided by subtractor circuit 88. The output of divider circuit 94 is coupled into Sigma circuit 96 the output of which is coupled to recorder 26.

In the operation of the portion of the surface electronics illustrated in FIG. 3, it should be recognized that an input signal cycle appearing at input terminal 38' consists of a series of trigger or sync pulses each followed by detected signal pulses and a quiescent period during which time the detected signal is repesentative of background. Further, it should be recognized that the signal pulses are comprised of some combination of exponential decay information and background information. The sync pulse is synchronized with the neutron burst from the subsurface instrument source 10. The signal pulses are random in time but on the average decrease in number exponentially with time. A relatively few follow each neutron burst, varying from zero to probably less than ten in number. This number is a function of instrument efficiency and well bore environment. Although the circuitry illustrated utilizes gates No. 1,2,3,4 through N, any number of gates can be used to accept the required number of pulses per cycle.

The input signal at junction 38' is amplified by amplifier circuit 42 and the sync signal is separated from the pulse signal by sync and signal separator circuit 42. The sync output is coupled into timing pulse generator circuit 46 which generates time oriented logic signals for the other circuit blocks. For example, if the desired signal pulses fall within a 600 microsecond interval, with a starting time 400 microseconds following each sync pulse, the following logic is generated:

A. A 600 microsecond "gate on" signal coupled into count rate meters 48 and 50 and single shot multivibrator 60 by means of electrical conductor 58 from timing pulse generator 46;

B. A 600 microsecond "gate on" signal coupled into gate 56 by means of electrical conductor 54 from timing pulse generator 46;

C. A reset pulse coupled out of timing pulse generator 46 into pulse detector circuit 66 and analyzer circuit 68.

The preferred embodiment contemplates the use of a 5 MHz clock which is used as the digital time reference for the measurement of the time relationship of the detected radiation pulses. The basic frequency of the clock is not critical, the value selected is determined by the desired accuracy of the measurement of the time relationship. The "gate on" pulse from timing pulse generator 46 into gate 56 enables clock pulses to be used to operate gate 72, 74, 76, 78 and 80. By way of example, gate 56 is open for 600 microseconds and the 5 MHz clock pulses are applied to the timing gate circuits during this period. Gates 72, 74, 76, 78 and 80 are in the "off" condition at all other times.

Count rate meter circuits 48 and 50 are in the "off" condition except when turned "on" by logic from timing pulse generator 46, in this example, for 600 microseconds starting 400 microseconds following each sync pulse. It should be recognized that the starting time of the measurement interval can be made variable as illustrated in U.S. Pat. No. 4,317,034, which is incorporated herein by reference, where the start time is variably set from between 200–400 microseconds after each sync pulse. When turned on, count rate meters 48 and 50 accept signal pulses from sync and signal separator circuit 42. The pulses detected are processed in two fashions. They are shaped and integrated with an approximate time constant to produce an analog signal proportional to the pulse rate. In addition, each signal pulse into count rate meter 48 is shaped and passed as a gating pulse to pulse detector circuit 66.

The timing gates 72, 74, 76, 78 and 80 are in the off position until the information begins, and the clock pulses are impressed on the inputs of the gates. When the first signal pulse occurs and is detected by pulse detector circuit 66, No. 1 gate 72 is turned on and remains on throughout the measure cycle. The output of No. 1 gate 72 is clock pulses equivalent to the time 600-T, where T, is the time difference between the beginning of the information cycle and the detection of the first signal pulse. A later, second signal pulse will open No. 2 gate 74 and produce a signal 600-$T_2$ and so on with the remainder of gates 76, 78 and 80. At the end of the measure cycle, the clock gate 56 cuts off the timing pulses to the timing gates 72, 74, 76, 78 and 80. The outputs of the gates are coupled into analyzer circuit 68.

Analyzer circuit 68 contains circuitry for counting the total number of clock pulses appearing in the combined inputs during a given cycle and also circuitry for converting the total digital count into an analog signal. The analyzer circuit 68 is reset by a reset signal appearing on the reset input coming from timing pulse generator 46. Analyzer circuit 68 processes the input clock pulses based upon the unique relationship between the macroscopic cross-section (Σ) and the pulse distribution. Therefore there is a unique Sigma value for every distribution of the detected radiation pulses, whether the distribution be determined as the arithmetic mean time, the medium time, or a weighted average.

By way of example, to obtain the relationship of the average time of pulse distribution to the Sigma value, with the detected pulses exponentially distributed in time, the probability of observing a pulse at any time is given by the relationship:

$$P(t) = P_o e^{-\Sigma vt} \tag{1}$$

where Po is the normalizing constant, v is the speed of the thermal neutrons causing the detected pulses, and Σ is the macroscopic absorption cross-section for thermal neutrons in the environment irradiated. The formal definition of the average time, $\bar{t}$ of the pulse distribution is given by:

$$\bar{t} = \frac{\int_{T_1}^{T_2} t \cdot P(t) \cdot dt}{\int_{T_1}^{T_2} P(t) \cdot dt} \tag{2}$$

where $T_1$ and $T_2$ are the starting and ending times, respectively of the measurement interval. By substitution for P(t) there is derived the normalized expression for the average pulse time:

$$\bar{t} = \frac{P_o \int_{T_1}^{T_2} t e^{-\Sigma vt} \cdot dt}{P_o \int_{T_1}^{T_2} e^{-\Sigma vt} \cdot dt} \tag{3}$$

if $T_1 = 0$ then $\bar{t}$ is referenced to the gate only, thus equation (3) can be rewritten as:

$$\bar{t} = \frac{1 - (1 + \Sigma vt) \exp(-\Sigma vT)}{\Sigma v\{1 - \exp(1 - \Sigma vT)\}} \tag{4}$$

where T is the width of the measurement gate. A more complete explanation of the method and apparatus for establishing this unique time measurement can be found in U.S. Pat. No. 4,046,764, which is incorporated herein by reference.

The time measurement of the pulse distribution during the measurement interval is the weighted average of the exponential time and the background time. For average time this relation is shown by:

$$\bar{t}_{mea} = \left[\frac{N_o - N_B}{N_o}\right] \bar{t}_e + \left[\frac{N_B}{N_o}\right] \bar{t}_B \tag{5}$$

where $\bar{t}$ represents the average time, the subscripts mea, e, and B are the measured, exponential and background, respectively, $N_o$ is the total counts during the measurement interval and $N_B$ is the equivalent duty cycle background counts. The value of $\bar{t}_B$ is known to be the midpoint of the measurement interval. Expression (5) can be rewritten as follows:

$$\bar{t}_{mea} = (1 - R) \bar{t}_e + RT_o \tag{6}$$

where R is the ratio of $N_B/N_o$ and $T_o$ is the midpoint of the signal measurement interval. Solving for average time measurement for the exponential yields:

$$\bar{t}_e = \frac{\bar{t}_{mea} - RT_o}{(1 - R)} \tag{7}$$

Returning now to FIG. 3, to perform background correction sync pulses are coupled from sync and signal separator circuit 42 into counter circuit 44. Upon receipt of the twenty-eight sync pulse counter circuit 44 outputs a signal to delay circuit 62 which, after a delay period preferably greater than 2000 microseconds, triggers single shot multivibrator circuit 63. The output from single shot 63 enables count rate meter 52 so that background pulses present during the quiescent period of the pulse cycle can be counted. Stated another way, four source firings out of every thirty-two firings are omitted. During the period of the firing cycle when there are no source firings background radiation is measured. The background counts are coupled into one input of divider circuit 82 the second input of which is the total count rate during the measurement interval. The output $[(N_B/N_o)$ or R] is coupled into one input of multiplier circuit 84 and one input of subtractor circuit 88. The second input into multiplier circuit 84 is a constant $(T_o)$ which is equivalent of the mid-point of the measurement interval as derived from single shot multivibrator circuit 60 which has an output signal equal to one-half the width of the measurement interval, this signal being converted into an analog value by pulse width converter circuit 86. The output $(RT_o)$ of multiplier circuit 84 is coupled into one input of two input subtractor circuit 92 the second input of which is the time measurement for the pulse distribution, in the above-description $\bar{t}$ meas. The output $(\bar{t}_{mea} - RT_o)$ of subtractor circuit 92 is coupled into one input of divider circuit 94.

As previously stated subtractor circuit 88 receives one input from divider circuit 82. The second input into subtractor circuit 88 is provided by scaler circuit 90. In the preferred embodiment the scaling factor is equal to 1, thus the output of subtractor circuit 88 and therefore the second input into divider circuit 94 is $(1-R)$. Divider circuit 94 processes the two inputs and provides an output signal which is a time measurement corrected for background. This output signal is a time measurement of the exponential decay, in following with the descriptive example $\bar{t}_e$, the average time for the exponential only. It should be recognized, as previously stated that use of average or arithmetic mean time distribution is only by way of example and that other time relationships such as medium or weighted average could be used without departing from the invention.

Figure 5:
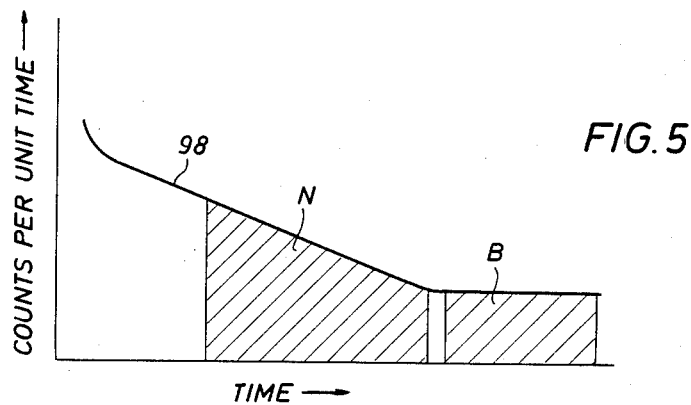
FIG. 5 is a schematic representation of the characteristic decay of a thermal neutron population following a burst of neutrons within a well and a method of utilizing detection gates to provide measurements of signal count rate and background count rate.

In an alternate embodiment of deriving a measurement of background intensity the electronic circuitry of FIGS. 2 and 3 can be modified so that background is measured during the same source pulsing cycle as signal measurements are derived. Such modification is illustrated by FIG. 5 which graphically relates counts per units of time to time. Counting rate curve 98 is exemplary of the decline of the thermal neutron population following each neutron source pulse. The signal counting rate and the time measurement is derived using signal interval N while background is measured during interval B. The timing measurement would then be corrected in a manner as previously described.

The corrected time measurement signal out of divider circuit 94 is coupled into Sigma conversion circuit 96 where the time measurement is converted into a Sigma value. For every time distribution of radiation there is a unique value of Sigma. This conversion is made in accordance with any of the methods common in the art, for example, such as by inverse linear fit, as described in U.S. Pat. No. 4,046,764, which previously was incorporated by reference, or by using a microprocessor controlled look-up table. The unique Sigma value is then recorded on suitable recording medium by recorder 26.

Thus, there has been described and illustrated herein a new and improved method and apparatus for background correction for thermal neutron decay measurements. Those skilled in the art will recognize that numerous variations and modifications may be made without departing from the present invention. Accordingly, it should be clearly understood that the forms of the invention herein are exemplary only, and are not intended as limitations on the scope of the present invention.

The embodiment of the invention in which an exclusive property or privilege is claimed are defined as follows:

1. A method for determining characteristics of earth formations surrounding a borehole, comprising the steps of:
    irradiating said earth formations with bursts of high energy neutrons;
    detecting radiations emanating from said irradiated formations;
    generating time-sequenced electrical pulses indicative of said detected radiations;
    generating an electrical signal functionally related to a time distribution of said time-sequenced elecrtrical pulses; and
    correcting said time distribution signal to compensate for background radiation.

2. The method of claim 1 further including the step of deriving from said background corrected time distribution signal an electrical signal functionally related to the macroscopic neutron absorption cross-ssection of said irradiated earth formations.

3. The method of claim 2 wherein said time distribution signal is representative of the arithmetic mean time of said time-sequenced electrical pulses.

4. The method of claim 2 wherein said time distribution signal is representative of the medium time of said time-sequenced electrical pulses.

5. The method of claim 2 wherein said time distribution signal is representative of the weighted average time of said time-sequenced electrical pulses.

6. A method for well logging, comprising the steps of:
    irradiating the formations surrounding a well with bursts of neutrons;
    detecting gamma radiations emanating from said irradiated formations and generating electrical pulses indicative of said detected radiations;
    generating a first measurement functionally related to a time distribution of said detected radiations, said time distribution measurement including an exponential characteristic and a background characteristic;
    generating a second measurement functionally related to said background characteristic; and
    correcting said time distribution measurement with said background characteristic measurement yielding a corrected time distribution measurement for said exponential characteristic.

7. The method of claim 6 wherein generating said time distribution measurement comprises the step of measuring the time distributuion of said electrical pulses within a predetermined time interval following each burst of neutrons.

8. The method of claim 7 wherein generating said background characteristic measurement comprises the steps of:
    measuring the count rate of said electrical pulses within said time interval;
    measuring the count rate of background radiation; and
    generating a correction measurement functionally related to the relative intensity of said measured background radiation to said measured electrical pulse count rate.

9. The method of claim 8 wherein said corrected time distribution measurement is functionally related to the arithmetic mean time of said exponential characteristic.

10. The method of claim 8 wherein said corrected time distribution measurement is functionally related to the medium time of said exponential characteristic.

11. The method of claim 8 wherein said corrected time distribution measurement is functionally related to the weighted average time of said exponential characteristic.

12. A method for determining characteristics of earth formations traversed by a borehole, comprising the steps of:
    pulsatingly irradiating said earth formations with repeated bursts of high energy neutrons;
    detecting secondary radiations emanating from said irradiated earth formations and generating time-sequenced electrical pulses indicative of said detected radiations;
    generating a first measurement functionally related to a time distribution of said electrical pulses within a preselected time interval;
    generating a second measurement functionally related to a time distribution of the relative background radiation within said preselected time interval;
    correcting said time distribution measurement of said electrical pulses with said time distribution of said relative background radiation; and
    computing the macroscopic neutron absorption capture cross section for said irradiated formations from said corrected time distribution measurement.

13. The method of claim 12 wherein said step of generating said second measurement comprises the steps of:
    generating a third measurement functionally related to the total count rate of said electrical pulses within said interval;
    generating a fourth measurement functionally related to the background radiation count rate; and
    deriving a measurement of the relative intensity of said background measurement to said total count rate measurement.

14. The method of claim 13 wherein said background radiation count rate is derived during a second time interval following each burst of neutrons.

15. The method of claim 13 wherein said background radiation count rate is derived during a second time interval comprising a quiescent period following a plurality of bursts of neutrons.

16. The method of claim 13 wherein said time distribution measurement comprises the arithmetic mean time distribution of said electrical pulses within said time interval.

17. The method of claim 13 wherein said time distribution measurement comprises the medium time distribution of said electrical pulses within said time interval.

18. The method of claim 13 wherein said time distribution measurement comprises a weighted average time distribution of said electrical pulses within said time interval.

19. Apparatus for determining characteristics of earth formations surrounding a borehole, comprising:
 means for irradiating said formations with bursts of high energy neutrons;
 means for detecting radiations occasioned in said irradiated formations by said burst of neutrons and for generating time-separated electrical pulses indicative of said detected radiations;
 circuit means for determining a time relationship of said electrical pulses within a preselected time interval; and
 means for correcting said time relationship to compensate for background representative information.

20. The apparatus of claim 19 wherein said means for correcting comprises:
 means for measuring the count rate of said electrical pulses within said time interval;
 means for measuring the count rate of background radiation; and
 means for deriving a measurement of the relative intensity of said measured background radiation to the intensity of said measured count rate of said pulses.

* * * * *